United States Patent Office 3,767,607 Patented Oct. 23, 1973

3,767,607

RUBBER SEALANT COMPOSITION

Julius L. Schneider, Chicago, Ill., assignor to Continental Can Company, Inc., New York, N.Y.

No Drawing. Continuation-in-part of application Ser. No. 877,461, Nov. 17, 1969. This application Aug. 31, 1971, Ser. No. 176,678
Int. Cl. C08d 9/12
U.S. Cl. 260—27 BB 6 Claims

ABSTRACT OF THE DISCLOSURE

Stable, thixotropic sealing compositions suitable for use as container end gasket and sealant materials are prepared from a solids mixture of a rubber compound, a tackifying resin, and a surface active filler, the solids mixture being dispersed in a water-immiscible organic solvent which is a solvent for the rubber composition, the filler having been treated with an amount of water sufficient to cause complete hydration of the filler.

BACKGROUND OF THE INVENTION

(1) Field of the invention

This application is a continuation-in-part of my copending application Ser. No. 877,461, filed Nov. 17, 1969.

This invention relates to metal containers, and more particularly, to containers having end seams formed of interfolded layers sealed by means of a rubber sealant.

(2) The prior art

Metal containers or cans are conveniently made from sheet metal. The can body is usually tubular and may be closed by a side seam or may be seamless. The end seam of such a tubular can is generally formed by interfolding an outwardly extending flange on a can body with an annular groove or peripheral flange on an end closure piece, the end flange having applied thereto a rubber sealant material, such as a butadiene/styrene copolymer, which is interfolded into the seam between the flanges to provide a gasket during the seaming operation.

The rubber sealant composition is generally applied to the end closure piece dispersed in aqueous media or dissolved in non-polar solvent by high speed machinery whereby the fluid composition is jetted through a hose-type nozzle onto the periphery of the revolving can end. As the can ends are fed to the lining machines at rates up to 700 per minute, the nozzle has to open and close 350 times per minute to allow a proper amount of fluid sealant composition to be passed into the annular groove of the can end.

In preparing the sealant composition, an aqueous emulsion of a rubber compound is mixed with surface active fillers, such as clays and the like, to render the same thixotropic. The property of thixotrophy allows the control of the flow properties of the sealant composition so that the composition remains fixed in the nozzle until additional pressure extrudes it into the flange of the end closure. The property of thixotropy further permits the opening and shutting of the nozzle without dripping or splashing of the sealant composition on the end closure, and permits the composition to remain fixed in the flange of the end closure after being deposited therein. In addition to the surface active filler, other materials commonly included in the rubber sealant formulations are tackifying resins, pigments, and antioxidants.

There has recently been made available to the market certain synthetic rubber polymers, namely, stereospecific butadiene/styrene copolymers which exhibit improved physical characteristics, such as easy solubility in non-polar solvents and total absence of microgels, and as such are highly advantageous materials for use as sealing compounds.

It has been the practice in the art that in order to prepare sealant formulations using synthetic rubbers which are sufficiently stable for use in container sealing equipment, the solid rubber polymer must be separated from the fluid polymerization media in which it was prepared, and dispersed in water along with the filler using suitable dispersing agents, which is a costly and time-consuming procedure.

In addition to the separation step, the intermilling of the water, solid rubber compound, and filler for a time sufficient to insure a homogenous, stable, finely-divided suspension necessitates the use of heavy duty milling equipment which is generally quite expensive in initial cost and the lengthy milling period required to produce a stable suspension of particles requires an appreciable consumption of power and high processing cost.

If it is attempted to avoid the use of aqueous emulsions of the rubber compound to prepare sealant formulations using an organic solution of the rubber compound, separation of the filler from the solvent portion of the formulation occurs quite rapidly, generally in about a week. As application of sealing compositions requires uniform, homogenous material, and as a substantial period of time may elapse between the preparation of the rubber sealing formulation and its application, such unstable formulations must generally be remilled or continuously stirred in a blending tank immediately before use which is an inconvenient, time consuming and costly procedure.

SUMMARY OF THE INVENTION

In accordance with the present invention, there is provided a method of preparing a homogenous suspension of a rubber compound and an inorganic surface active filler which suspension is stable over extended periods without separation of the liquid and solids phases wherein the rubber is dissolved into an inert, non-polar, organic, substantially water-immiscible solvent, and the rubber solution mixed with moderate agitation with an inorganic surface active filler treated with an amount of water sufficient to completely hydrate the filler.

The rubber/filler sealing compositions of the present invention are extremely stable and can be stored for an indefinite time without separation. The need for heavy, expensive milling equipment is eliminated in the present invention, as these suspensions are prepared by subjecting the mass of rubber solution and filler to simple mechanical agitation. Due to the simplicity in formulation of the compositions of the present invention, the viscosity and thixotropic properties of the liquid sealing composition are easily controlled to accommodate a wide variety of sealing uses and render the sealing formulations applicable by existing automatic machinery. The sealing compositions of the present invention possess all the required sealing properties characteristic of rubber compositions generally employed as gasket materials for container end closures.

PREFERRED EMBODIMENTS

The principal solids components of the sealant compositions of the present invention include about 10% to about 20% by weight rubber, about 35% to about 50% by weight of the hydrated surface active inorganic filler, and about 30% to about 55% by weight of the tackifying resin.

Preferably, the rubber comprises about 15% to about 25% by weight of the solids content of the sealing composition, the hydrated surface active filler comprises about 40% to about 50% by weight of the solids content of the sealing composition, and the tackifying resin comprises about 25% to about 35% by weight of the sealing composition.

In applying the sealing compositions of the present invention, the composition is a thixotropic liquid composition containing about 30% to about 65% by weight of solids dispersed in 35% to 70% by weight of the organic solvent. For most purposes, a sealing composition consisting of 40% to 50% by weight solids and 50% to 60% by weight organic solvent is used.

As used in the specification and claims, the term "rubber compound" means organic polymeric materials which are rubbery and elastic at room temperatures and includes at least one of the following materials: natural rubber, polymers and copolymers of conjugated diolefins, e.g., polybutadiene, butadiene/styrene copolymers, butadiene/acrylonitrile copolymers, polymers and copolymers of methyl pentadiene, and polymeric forms of chlorine substitution products of conjugated diolefins, e.g., polychloroprene. The butadiene/styrene copolymers have a butadiene content of from about 50% to about 95% by weight, and a styrene content of about 5% to about 50% by weight. The butadiene/acrylonitrile copolymers have an acrylonitrile content of from 15% to 45% acrylonitrile and the remainder butadiene.

The essential features of organic solvents which are employed in the practice of the present invention are that it forms a solution with the rubber compound employed in the sealing composition and is inert or unreactive with the rubber compound. Preferably, the organic solvent is one which is readily evaporated after the sealing composition has been applied to the container closure. The evaporation of solvent may occur either by air drying or by a sufficiently raised temperature to drive off the solvent. Preferably, the solvents are volatile and have boiling points under 120° C., and generally about 70° to about 115° C. Examples of such solvents include hexane, octane, methyl, ethyl ketone, acetone and toluol.

A preferred rubber compound for use in preparing the sealant compositions of the present invention are solution type stereospecific butadiene-styrene copolymer rubbers which are prepared by copolymerizing butadiene and styrene in solution in an organic solvent such as hexane with alkyl lithium catalysts. Solution polymerized butadiene/styrene copolymer rubbers have a narrower molecular weight distribution and higher molecular weight than emulsion polymerized copolymers. Solution polymerized stereospecific butadiene/styrene copolymer rubbers are commercially available. An example of a commercially available solution polymerized stereospecific butadiene/styrene rubber is Stereon 700 (trademark) manufactured by the Firestone Tire and Rubber Company. Stereon 700 has a glass transition temperature of −78° C., a specific gravity of 0.9, a styrene content of about 21%, and the microstructure of the butadiene portion being approximately 40% cis, 1,4; 52% trans, 1,4; and 8% 1,2. The cooplymer has a molecular weight of 289,500 and a mean average molecular weight of 165,200. The finished polymerization solution contains about 20% to about 26% solids in hexane, has a very low ash and monomer content, and can, in the condition received from the polymerization reactor, be used directly for preparing sealing compositions with hydrated surface active fillers and tackifying resins, thereby avoiding a separation and redissolution step, in the preparation of sealant compositions.

The term "surface active inorganic filler" as used herein means any inorganic mineral material commonly incorporated in liquid or organic resin coating compositions to control the liquid flow properties of the composition and which are surface active, i.e., are capable of reacting with water to form a hydrated composition. Examples of inorganic surface active fillers useful in the practice of the present invention include diatomaceous earth, silica flour, aluminum silicates, and clays such as bentonite and kaolin.

It is preferred that the surface active inorganic filler be surface treated to have organophilic properties. For example, clays such as bentonite and kaolin in their raw state are hydrophilic, but upon reacting with organic bases or their salts, such as primary, secondary and tertiary, aliphatic, cyclic, aromatic, amines and polyamines, and quaternary ammonium compounds, become organophilic products. Hydrophilic clays which have been surface treated to become organophilic products are commercially available. The surface active filler should have an extremely small particle size generally in the range of about 0.5 to about 5.0 microns, in order to achieve a uniform dispersion.

An example of a commercially available clay which has been surface-treated to become organophilic are the Kaophobe series of amine-oleic acid surface modified aluminum silicates manufactured by the Georgia Kaolin Company. An example of such clay is Kaophobe 5 (trademark), which has a median particle diameter of 0.55, a No. 2 Mohs Hardness Scale, a refractive index of 1.56, and a specific gravity of 2.61.

Organophilic clays are preferred in preparing the sealant compositions of the present invention as it has been found that such treated clays have a minimum effect on discoloration of the anti-oxidants that are normally incorporated in the rubber formulations to provide improved aging properties thereto.

In order to obtain a stable suspension of the rubber and filler compounds in the organic solvent, it is necessary and critical feature of the present invention that the surface active material used as the filler in the sealant composition be contacted with an amount of water which will react with and completely hydrate the filler. The method of hydrating the filler wtih water is not critical. Specifically, the filler can be allowed to be intimately admixed or contacted with the water prior to incorporating the filler in the rubber solution or the water and surface active filler can be introduced separately or at different times into the sealant composition and then hydrated during the mixing of the filler with the solution of rubber and tackifying resin to form the sealant suspension.

To achieve complete hydration of the surface active filler before its incorporation in the rubber solution, the filler is immersed in a water bath with stirring for a period of about 5 to about 15 minutes at ambient temperature, and then separated from the water in the bath. In the case where the filler is hydrated while in the sealant suspension, the amount of water required for complete hydration, will, of course, vary with the filler material employed. To insure complete hydration of the surface active filler, the amount of water incorporated in the sealing composition ranges from about 4% to about 15% by weight of the filler.

To aid in the hydration of the filler there is incorporated in the water about 20 to about 30% by weight of the water of an aliphatic ketone such as acetone. The aliphatic ketone acts to increase the rate at which hydration of the filler is achieved.

To impart improved tackiness to the sealant compositions at room temperature, tackifying resins are incorporated in the sealant formulation. Suitable tackifying resins include any resin which has adhesive qualities and is compatible with the rubber compound and is soluble in the organic solvent used for the dissolution of the rubber. Examples of preferred tackifying resins which may be employed include rosin, polymerized rosin acid, hydrogenated rosin, and esters of these rosin acids, with polyhydroxy alcohols, such as ethylene glycol, polyethylene glycols, glycerol and pentaerythritol. A commercially available tackifying resin which has been found particularly useful in the preparation of the sealant compositions of the present invention is Pentalyn 344 (trademark) manufactured by the Hercules Powder Company. Pentalyn 344 is a pentaerythritol ester of a rosin acid, and has a softening point of 111° C. and an acid number of 10.

In addition to tackifying resins, other components which may optionally be included in the sealant compositions of the present invention include antioxidants, such as di-beta naphthyl-paraphenylene diamine. Other well-known rubber antioxidants may be substituted. Pigments, such as titanium dioxide and carbon black are also of value to facilitate inspection of lined container ends, but they may be omitted if a clear film is desired.

The amount of antioxidant incorporated in the sealing compositions of the present invention can range from 0.1% to 1% by weight. The amount of pigment which can be incorporated in the sealing compositions ranges from 0.5 to 2.5% by weight.

The sealing compositions of the present invention form, when dried, a plastic, flexible and tough sealing film which is possessed of other required properties, such as water resistance and insolubility for most purposes where metal containers are used, and are devoid of odor- and taste-imparting characteristics. Moreover, these compositions possess the required chemical inertness and resistance, and are compatible with and strongly adherent to metal surfaces to be sealed, such as tin plates or tin-free steel, upon which is forms a film of required firmness. The film does not break or chip when the metal is sharply bent or folded as in double seaming operations, and does not tend to separate from the metal or shrink under the temperature changes encountered in metal container manufacture or use.

An example of a rubber sealant composition prepared in accordance with this invention is as follows:

| | Parts by weight |
|---|---|
| Stereon 700 (21.2% total solids); rubber (23 parts); hexane (88.3 parts) | 112.0 |
| Kaophobe 5 | 61.6 |
| Pentalyn 344 | 55.4 |
| Water | 8.8 |
| Acetone | 2.2 |
| $TiO_2$ | 1.54 |
| Channel black | 0.09 |
| Di-beta naphthyl-p-phenylene diamine | 0.36 |
| Hexane | 64.0 |

The above composition was prepared by mixing together hexane, Kaophobe 5, channel black, and $TiO_2$ allowing it to stand a few minutes, and then adding the acetone and water and dispersing thoroughly by means of a high shear mixer. The Pentalyn 344 and Stereon 700 were then added and mixed again. The resultant rubber sealant composition of this example was of a putty-like consistency having a total solids content of 48.3% and a Brookfield viscosity (with a No. 3 spindle at 23° C.) as follows.

| R.p.m.: | Cps. |
|---|---|
| 20 | 4800 |
| 10 | 6200 |
| 4 | 9500 |
| 2 | 15000 |

Upon standing for 3 months, no noticeable separation of liquid and solid phases were observed. By way of contrast, when an identical formulation was prepared with the exception that water was excluded, separation of liquid and solid phases was observed within 7 days.

The composition of the example was applied in a thickness of 0.010 inch to a steel sheet. The steel sheet with the applied composition was placed in an oven and heated to 115° C. for a period of about 5 minutes. Upon removal from the oven, the dried film had the following properties:

| | |
|---|---|
| Color | Gray. |
| Short A Hardness (compressed at 72° F.) | 75 initial, 50 after 15 seconds. |
| Specific gravity | 1.39. |

What is claimed is:

1. A stable, thixotropic sealing composition comprising a solids mixture of (a) from about 15% to about 25% by weight of a rubber compound selected from the group consisting of natural rubber, polymers of butylene, polymers of chloroprene, copolymers of butadiene and styrene, copolymers of butadiene and acrylonitrile and polybutadiene, (b) from about 40% to about 50% by weight of a solid, inorganic surface active filler selected from the group consisting of diatomaceous earth, silica flour, aluminum silicate and clay, treated to have organophilic properties having a particle size of about 0.5 to about 5.0 microns, the filler having been contacted with an amount of water sufficient to cause complete hydration of the filler, and (c) from about 25% to about 35% by weight of a tackifying resin selected from the group consisting of rosin, polymerized rosin acid, hydrogenated rosin and rosin acid esters, the solids mixture being dispersed in an inert, non-polar, water immiscible, organic solvent which is unreactive with the rubber and has a boiling point of about 70° C. to about 120° C.

2. The composition of claim 1 wherein the sealing composition cotnains about 30 to about 65% by weight of the solids mixture dispersed in about 35 to about 70% by weight of the organic solvent.

3. The composition of claim 1 wherein water is incorporated in the sealing composition after the addition of the filler to the sealing composition to hydrate the filler.

4. The composition of claim 3 wherein the amount of water incorporated in the rubber composition ranges from about 4% to about 15% by weight based on the weight of the filler.

5. The composition of claim 1 wherein the rubber composition is a solution type stereospecific butadiene/styrene copolymer rubber.

6. The composition of claim 1 wherein the surface active filler is a hydrophilic clay which has been surface treated to become organophilic.

References Cited

UNITED STATES PATENTS

| | | | |
|---|---|---|---|
| 2,818,169 | 12/1957 | Bergstedt | 206—59 |
| 2,881,096 | 4/1959 | Kisbany | 260—27 BB |
| 3,015,638 | 1/1962 | Sergi | 260—27 BB |
| 2,884,400 | 4/1959 | Moore | 260—27 BB |
| 2,985,606 | 5/1961 | Roecker | 260—27 BB |
| 2,903,439 | 9/1959 | Wolf | 260—27 BB |
| 2,615,059 | 10/1959 | Bemmels | 260—755 |
| 2,487,060 | 11/1949 | Pike | 260—27 Bu |
| 2,537,982 | 1/1951 | Finn | 260—27 Bu |
| 3,352,817 | 11/1967 | Meyer | 260—45.7 R |

OTHER REFERENCES

"Rubber World," 1968, pp. 277–280.

DONALD E. CZAJA, Primary Examiner

W. E. PARKER, Assistant Examiner

U.S. Cl. X.R.

260—33.6, 41, 41.5, 755, 756